No. 872,595. PATENTED DEC. 3, 1907.
H. WARSHILSKY.
BOTTLE WASHER BRUSH.
APPLICATION FILED JUNE 5, 1907.
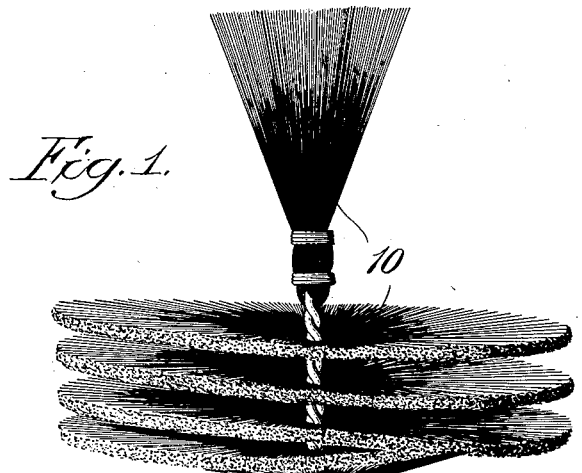
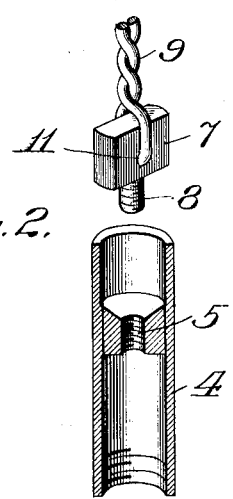
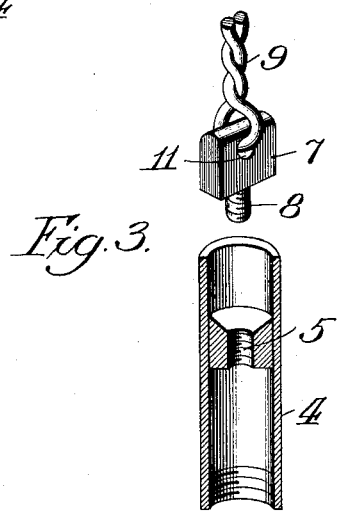
Witnesses: Inventor:
Harry Warshilsky, ly
UNITED STATES PATENT OFFICE.

HARRY WARSHILSKY, OF CHICAGO, ILLINOIS, ASSIGNOR TO E. GOLDMAN & COMPANY, OF CHICAGO, ILLINOIS, A CORPORATION OF ILLINOIS.

BOTTLE-WASHER BRUSH.

No. 872,595.　　　Specification of Letters Patent.　　　Patented Dec. 3, 1907.

Application filed June 5, 1907. Serial No. 377,295.

*To all whom it may concern:*

Be it known that I, HARRY WARSHILSKY, a subject of the Emperor of Germany, residing at Chicago, in the county of Cook and State of Illinois, have invented a new and useful Improvement in Bottle-Washer Brushes, of which the following is a specification.

My invention relates to an improvement in the construction of the brush-device used for scouring the interiors of bottles in a bottle-washing machine, one example of such a machine being that shown and described in Letters Patent of the United States No. 827,388, dated July 31, 1906.

The object of my invention is to provide a novel construction of connection between the stem of the brush and the ferrule (usually formed of brass), to adapt the brush to be readily joined to and separated from the ferrule and thus enable the ferrule to be used permanently and permit a new brush to be readily applied to it for replacing one that is worn out, which may be discarded.

In the accompanying drawing, Figure 1 shows my improved device by a view in elevation; Fig. 2 is a perspective view showing the ferrule in longitudinal section and in unassembled relation to it the eyelet which screws into the ferrule for connecting therewith the brush-stem, shown broken away, and Fig. 3 is a view like that presented in Fig. 2 but showing a slight modification.

The ferrule 4, which is commonly formed of brass in the shape of a cylindrical tube internally threaded at its lower end to adapt it to be screwed on its carrying-stem (not shown) in the machine, contains a nut 5 fastened in place by a pin or rivet 6 inserted into it through the wall of the ferrule. An eyelet 7, of iron and of the preferred general rectangular shape shown, fits removably in the ferrule and carries a screw-stem 8, which, when the eyelet is introduced into the ferrule at one end thereof, is adapted to be screwed into the nut 5. The stem 9 of the brush 10 affords a handle through the medium of which to manipulate the eyelet in screwing it into and unscrewing it from its retaining nut. This stem is commonly and preferably formed of twisted wire with the material of the brush fastened between the strands in the usual manner; and the wire is looped at the end of the stem, which it forms, through the hole 11 of the eyelet and may be rigidly clenched on the latter to render the stem rigid, as represented in Fig. 2, or it may be loosely connected to the eyelet through its hole 11 to render the connection therewith of the stem flexible according to the modification illustrated in Fig. 3.

The construction thus described affords a simple and inexpensive connection for the brush with a ferrule, adapting it to be fastened thereto and disconnected therefrom with extreme facility; and the eyelet itself is an article of such little value that it may be discarded with a worn-out brush, though if desired, it may be saved for use with the stem of a new brush.

What I claim as new and desire to secure by Letters Patent is—

1. In a bottle-washer brush-device, the combination of a ferrule containing and having housed within it between its ends a nut, an eyelet consisting of a solid metal head insertible into the ferrule and provided with a threaded stem screwing into said nut, and a brush on a stem connected with said eyelet and affording a handle through the medium of which to manipulate the eyelet in screwing it into and unscrewing it from the nut.

2. In a bottle-washer brush-device, the combination of a ferrule containing and having housed within it between its ends a nut, an eyelet consisting of a solid metal head insertible into the ferrule and provided with a hole and with a threaded stem screwing into said nut, and a brush on a stem looped through said hole and affording a handle through the medium of which to manipulate the eyelet in screwing it into and unscrewing it from the nut.

HARRY WARSHILSKY.

In presence of—
　RALPH A. SCHAEFER,
　J. H. LANDES.